United States Patent [19]

Fukuzaki et al.

[11] 4,249,927
[45] Feb. 10, 1981

[54] METHOD AND APPARATUS FOR MANUFACTURING GLASS PRODUCTS BY CONTROLLING FREE FLOW OF LOW VISCOSITY MOLTEN GLASS

[75] Inventors: Fukushichi Fukuzaki, Machida; Yoshio Ishii, Sagamihara; Masaki Fukuzawa, Yokohama, all of Japan

[73] Assignee: Kabushiki Kaisha Ohara Kogaku Garasu Seizosho, Kanagawa, Japan

[21] Appl. No.: 62,879

[22] Filed: Aug. 1, 1979

[51] Int. Cl.³ .................................................. C03B 7/12
[52] U.S. Cl. .............................................. 65/75; 65/70; 65/123; 65/207; 65/332
[58] Field of Search ................... 65/70, 75, 122, 123, 65/207, 223, 226, 330, 331, 332, 128

[56] References Cited

U.S. PATENT DOCUMENTS

| 1,323,507 | 2/1919 | Wadsworth | 65/207 |
| 1,763,968 | 6/1930 | Howard | 65/122 |

Primary Examiner—Arthur D. Kellogg
Attorney, Agent, or Firm—Ladas & Parry

[57] ABSTRACT

According to the first method according to the present invention, there is provided a method for manufacturing glass products by casting low viscosity glass into a mould while controlling free flow of the glass by storing and holding the glass continuously fed out of a feeder outlet in a region under the lower surface of a control member provided below the feeder outlet after a cutting step, whereby the operation for setting a next mould to receive the glass in position is facilitated, the shape of the flowing glass after cutting is made stable and homogeneous gob can be produced. According to the second method of the invention, glass products are manufactured by casting the glass into a mould while controlling the free flow of the glass continuously fed out of the feeder outlet by storing and holding the glass not only in a region under the lower surface of the control member but also in a region above the upper surface of the control member by raising and lowering the control member whereby the glass flow is controlled over a wider range of glass flowing speed.

The above described two methods of the present invention are applicable not only to production of a gob for an optical glass but effectively to processes for forming boards, bars etc. respectively having certain dimensions and configurations after cutting off low viscosity glass fed continuously out of a feeder.

4 Claims, 8 Drawing Figures

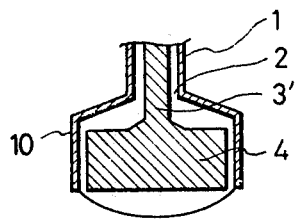
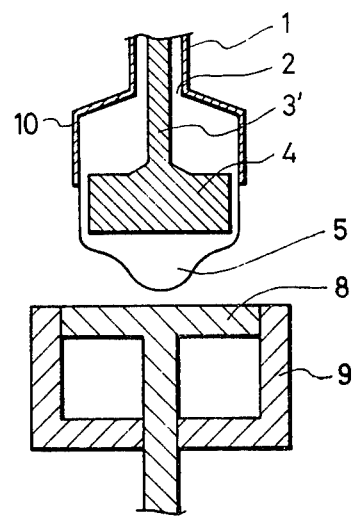
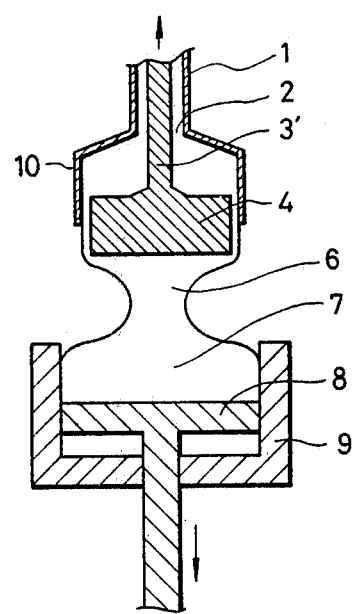
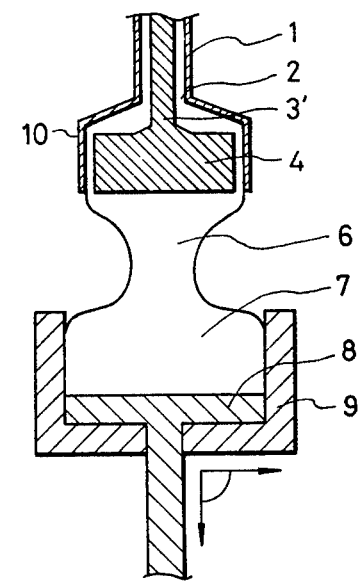

METHOD AND APPARATUS FOR MANUFACTURING GLASS PRODUCTS BY CONTROLLING FREE FLOW OF LOW VISCOSITY MOLTEN GLASS

TITLE OF THE INVENTION

Method and apparatus for manufacturing glass products by controlling free flow of low viscosity molten glass.

BACKGROUND OF THE INVENTION

This invention relates to a method and an apparatus for manufacturing glass products by controlling free flow of flow viscosity molten glass so as to delay starting of free flow after cutting of the low viscosity molten glass flowing continuously from a feeder outlet.

There are many optical glasses which have tendency to devitrification during the melting process. For securing a required quantity of product while preventing occurrence of devitrification in forming such glasses into desired products, it has been customary to maintain the glass at an extremely low viscosity in the order of about 10 to 100 poises, cause this low viscosity glass to flow out of a feeder outlet of a relatively small diameter at a relatively high speed, cut the glass flow for obtaining a predetermined volume of gob and form this gob into the desired product. If a pair of shear blades which are normally used for cutting the flow of a relatively high viscosity glass are utilized for cutting the flow of the low viscosity glass, the glass tends to spatter or the glass flow tends to be disturbed with a result that defects such as folds or seams occur in the gob.

Various proposals have been made for cutting the glass flow without using the shear blades and thereby producing homogeneous gob. Japanese Patent Publication No. 24525/1976, for example, discloses a method for forming a gob by pouring glass flowing from the feeder outlet into a mould and moving the glass in the mould rapidly downwardly for cutting the glass flow when the glass has reached a predetermined amount. According to this method, however, a time interval between the cutting of the glass flow and restarting of flowing down of the glass from the feeder outlet is so short that it is not easy to set a mould for receiving a next gob of glass in position within this time interval. Besides, since the glass flow stretches long and assumes an unstable shape, occurrence of folds in produced gob cannot be sufficiently prevented.

Japanese Laid Open Patent Publication No. 50218/1978 discloses a method for forming a gob by cutting the glass flow by displacing a blade horizontally after pouring the glass flowing from a feeder outlet into a mould, holding the glass flow on the blade until a next mould is disposed beneath the feeder and then removing the blade from the glass flow to let the glass flow into the next mould. According to this method, intervention of the blade between the feeder and the mould creates an improper distance between them and gives rise to the above described disadvantages by a very rapid flowing down of the glass from the feeder immediately after cutting of the glass flow.

SUMMARY OF THE INVENTION

It is, therefore, an object of the invention to provide a novel method and apparatus for eliminating the above described disadvantages of the prior art methods occurring after cutting of the low viscosity molten glass flow and manufacturing glass products which are homogeneous, free from folds and of a stable configuration.

Features of the present invention are described in the appended claims. According to the first method of the invention, glass products are manufactured by controlling free flow of low viscosity molten glass, i.e. by bringing the low viscosity molten glass continuously fed out of a feeder outlet into contact with a control member provided below said feeder outlet, pouring the flowing glass into a mould provided below the control member, cutting the flowing glass and thereafter causing the glass to flow down to the mould after storing and holding the glass which continues to be fed out of the feeder outlet in a region under the lower surface of the control member by utilizing the surface tension of the glass so as to prevent immediate dripping of the glass to the mould.

According to the second method of the invention, glass products are manufactured by bringing the low viscosity molten glass continuously fed out of a feeder outlet into contact with a vertically reciprocable control member provided below the feeder outlet and being in a predetermined lower limit position, pouring the flowing glass into a mould provided below the control member while raising the control member to a predetermined upper limit position below the feeder outlet, cutting the flowing glass after a predetermined amount of the glass is filled in the mould and thereafter causing the glass to flow down to the mould after storing and holding the glass which continues to be fed out of the feeder outlet both in a region on the upper surface of the control member and in a region under the lower surface of the control member by lowering the control member gradually in accordance with volume of the glass fed out of the feeder outlet.

In both of the two methods, the control member functions to develop glass flowing out of the feeder outlet after cutting of the glass flow into a glass drop at least under the lower surface of the control member for restricting free flow of the glass and thereby delaying time when the glass starts dripping to the mould. Accordingly, the control member should preferably be of such dimensions that can hold a maximum amount of glass to be developed into a glass drop regardless of the diameter of the feeder pipe.

In the following description, preferred embodiments of the first and second methods of the invention and apparatuses employed therefor will be described with respect to a case where a gob is produced.

BRIEF DESCRIPTION OF THE DRAWINGS

FIGS. 1 through 4 are sectional views showing an embodiment of the first method and apparatus according to the present invention and FIGS. 5 through 8 are sectional views showing an embodiment of the second method and apparatus according to the invention.

DESCRIPTION OF PREFERRED EMBODIMENTS

Figure 1:
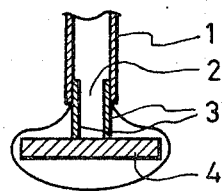
Figure 2:
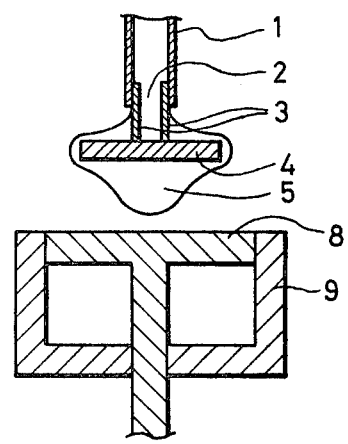

A first embodiment of the method and apparatus according to the invention will now be described with reference to FIGS. 1-4. In the illustrated example, the apparatus includes a feeder pipe 1 having an outlet 2 opening downwardly and a control member 4 in the form of a disc having a diameter of 15 mm which is disposed horizontally and secured to the feeder pipe 1 by means of a pair of support bars 3 extending downwardly from the lower inside portion of the feeder pipe 1. A mould consisting of an insert mould 8 and a body mould 9 is set below the control member 4. The feeder pipe 1, support bars 3 and control member 4 are all made of platinum or a platinum alloy. FIGS. 1 and 2 show a step for controlling a free flow of the low viscosity molten glass delivered from the outlet 2 of the feeder pipe 1 among a series of steps for producing a gob.

Figure 3:
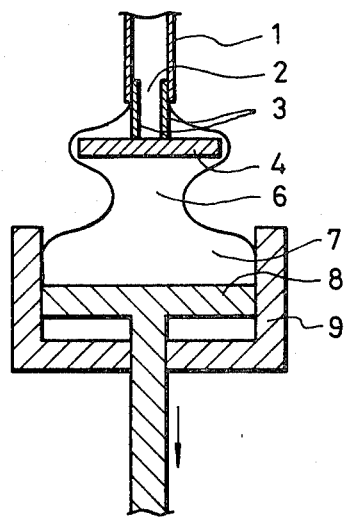
Figure 4:
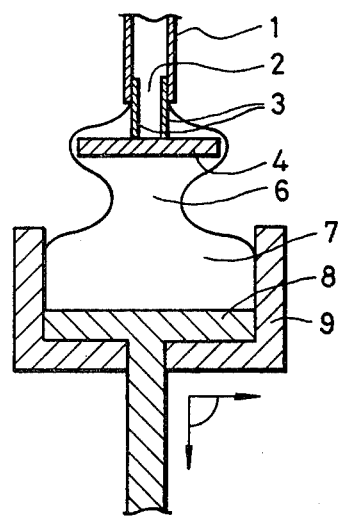

Referring first to FIG. 1, the molten glass fed from the feeder outlet 2 is brought into contact with the entire surface of the control member 4 through the support bars 3. The glass subsequently stays under the lower surface of the control member 4 as shown in FIG. 2 and develops into a glass drop 5 which is in a state immediately before dripping. In the meanwhile, the insert mould 8 is set below the glass drop 5. The glass drop 5 which has now grown to such an extent that its weight exceeds the surface tension of the glass starts dripping. As the glass flows from the control member 4 into the mould, the insert mould 8 is moved downwardly as shown in FIG. 3 so as to prevent flowing glass 6 from folding against filled-in glass 7. When the glass filled in the mould has reached a predetermined quantity, the mould with the filled-in glass 7 is moved rapidly downwardly or horizontally as shown in FIG. 4 for cutting the glass 6 flowing from the control member 4 and thereby separating the filled-in glass 7 in the mould to form a gob. After cutting of the flowing glass 6, the glass remaining on the lower surface of the control member 4 assumes the state shown in FIG. 1 again, flowing down of the glass delivered from the outlet 2 being controlled until it reaches the state shown in FIG. 2.

In the above described embodiment, delay of time in start of dripping of the glass after the cutting of the glass flow is approximately 0.3 to 0.5 second or 0.1 to 0.3 second, as compared with substantially nil in the above-mentioned prior art methods, in the case wherein an optical glass of low viscosity of about 30 poise is fed at a velocity of 1 cc/sec or 2 cc/sec. As a result, an operation for setting a next mould at the predetermined glass receiving position after cutting the glass flow is greatly facilitated. Besides, a top shape of the glass flowing in the mould is remarkably stabilized and a homogeneous gob free from a fold is obtained.

Referring now to FIGS. 5 through 8, a second embodiment of the method and apparatus according to the invention will be described. In the apparatus shown in FIGS. 5 through 8, a control member 4 of a columnar shape is secured horizontally to a support bar 3' which is vertically movably provided in the feeder pipe 1. A glass holding cylinder 10 is formed at the lower end of the feeder 1 in such a manner that the cylinder 10 will enclose the control member 4 with a small gap between the inner wall of the cylinder 10 and the outer wall of the control member 4. A mould consisting of the insert mould 8 and the body mould 9 is set beneath the control member 4. The feeder pipe 1, support bar 3', control member 4 and glass holding cylinder 10 are all made of platinum or a platinum alloy. The upper portion of the support bar 3' is connected to an operating unit (not shown) for moving the support bar 3' upwardly and downwardly. FIGS. 5 and 6 show a step for controlling dripping of the glass among a series of steps for producing a gob. In FIG. 5, the control member 4 is disposed at an upper limit position in the vicinity of the feeder outlet 2 and molten glass which is fed out of the feeder outlet 2 is brought into contact with the entire surface of the control member 4. Then, the control member 4 is gradually moved down with the support bar 3' in accordance with feeding of the glass until it stops at a predetermined lower limit position in which the upper end of the control member 4 will still stay within the glass holding cylinder 10 as shown in FIG. 6. The molten glass therefore is held within the glass holding cylinder 10 above the upper surface of the control member 4. By utilizing the surface tension of the glass, a portion of the glass is held under the lower surface of the control member 4 in the form of a developed glass drop 5. In the meanwhile, the insert mould 8 is positioned beneath the glass drop 5. This glass drop 5 then starts flowing down into the mould. The glass is filled in the mould by moving the insert mould downwardly, while the control member 4 is gradually moved upwardly as shown in FIG. 7. When the control member 4 has stopped at the upper limit position shown in FIG. 5 and a predetermined amount of the glass has been filled in the mould, the filled-in glass 7 is rapidly moved away downwardly or horizontally with the mould as shown in FIG. 8 for cutting the glass flow and thereby separating the filled-in glass 7 to form a gob. After cutting of the flowing glass 7, the glass remaining on the upper and lower surfaces of control member 4 assumes the state shown in FIG. 5 again, the flowing down of the glass delivered from the outlet 2 being controlled until it reaches the state shown in FIG. 6.

In this embodiment, delay of time in start of dripping of the glass after the cutting of the glass flow consists of holding time of the glass drop 5 built under the lower surface of the control member 4 and time required for the control member 4 to move downwardly by a predetermined distance. Delay of time in start of dripping is approximately 2.5 second or 1.3 second in a case wherein the diameter of the control member 4 is 20 mm and the distance of its downward movement is 7 mm and an optical glass of low viscosity of about 30 poise is fed at a velocity of 1 cc/sec or 2 cc/sec. This arrangement further facilitates the operation for setting a next mould at the predetermined glass receiving position and achieves a desired delay time even for glass of a higher flowing speed so that the gob producing efficiency is further improved.

One example each of the two methods and apparatuses according to the invention has been described above. The methods and apparatuses of the invention, however, are not limited to these examples. In either of the two methods, for instance, the control member 4 may be of plane, convex or concave upper and lower surfaces, have folds thereon or have small apertures opening from the upper surface to the lower one, or may be a mixture of these elements. The above methods and apparatuses according to the invention are applicable to a case wherein a set amount of molten glass is poured in a mould and thereafter the glass flow is cut by other means than those described above, such as employing shearing blades. As regards the embodiment shown in FIGS. 5 through 8, control of dripping of the glass will be enhanced by providing branches or disc for catching glass on the portion of the support bar 3' which comes out of the feeder outlet 2 when the control member 4 is moved downwardly so that the effect of holding the glass in the region above the control member 4 will be increased.

Since the first method according to the invention is, as described above, a method for manufacturing glass products by casting low viscosity glass into a mould while controlling the flow of the glass by storing and holding the glass continuously fed out of the feeder outlet in a region under the lower surface of the control member after the cutting step, the operation for setting a next mould to receive the glass in position is facilitated. Besides, the shape of the flowing glass after cutting is made stable and a homogeneous gob can be readily produced.

Further, since the second method of the invention is a method for manufacturing glass products by casting the glass into a mould while controlling the free flow of the glass continuously fed out of the feeder outlet by storing and holding the glass not only in a region under the lower surface of the control member but also in a region above the upper surface of the control member by raising and lowering the control member, this second method can control the glass flow effectively over a wider range of glass flowing speed than by the first method and a homogeneous gob free from folds can be produced more efficiently.

The above described two methods of the present invention are applicable not only to production of a gob for an optical glass but effectively to processes for forming boards, bars etc. respectively having certain dimensions and configurations after cutting off low viscosity glass fed continuously out of a feeder.

What is claimed is:

1. A method for manufacturing glass products by controlling free flow of low viscosity molten glass which comprises, bringing the low viscosity molten glass continuously fed out of a feeder outlet into contact with a control member provided below said feeder outlet, pouring the flowing glass into a mould provided below said control member, said flowing glass keeping contact with said control member while said flowing glass is received in said mould, cutting the flowing glass in a position below said control member and thereafter causing the glass to flow down to the mould after storing and holding the glass which continues to be fed out of said feeder outlet in a region under the lower surface of said control member for a predetermined period of time by utilizing the surface tension of the glass.

2. In an apparatus for manufacturing glass products including a feeder pipe for continuously feeding low viscosity molten glass, cutting means for cutting the glass fed out of said feeder pipe and a plurality of moulds which are displaced one by one to a region below said feeder pipe to receive the glass cut off by said cutting means, the improvement which comprises a control member provided below an outlet of said feeder pipe and above one of said moulds disposed below said feeder pipe, said cutting means being provided below said control member, said flowing glass keeping contact with said control member while said flowing glass is received in said mould and said control member storing and holding the glass fed out of said feeder in a region under the lower surface of said control member for a predetermined period of time after cutting of the glass.

3. A method for manufacturing glass products by controlling free flow of low viscosity molten glass which comprises, bringing the low viscosity molten glass continuously fed out of a feeder outlet into contact with a vertically reciprocable control member provided below said feeder outlet and being in a predetermined lower limit position, pouring the flowing glass into a mould provided below said control member while raising said control member to a predetermined upper limit position below said feeder outlet, cutting the flowing glass after a predetermined amount of the glass is filled in said mould and thereafter causing the glass to flow down to the mould after storing and holding the glass which continues to be fed out of said feeder outlet both in a region on the upper surface of said control member and in a region under the lower surface of said control member for a predetermined period of time by lowering said control member gradually to said lower limit position in accordance with volume of the glass fed out of said feeder outlet.

4. In an apparatus for manufacturing glass products including a feeder pipe for continuously feeding low viscosity molten glass, cutting means for cutting the glass fed out of said feeder pipe and a plurality of moulds which are displaced one by one to a region below said feeder pipe to receive the glass cut off by said cutting means, improvement which comprises a downwardly opening glass holding cylinder provided at the lower end of said feeder pipe and a control member provided below an outlet of said feeder pipe and above one of said moulds disposed below said feeder pipe and being vertically reciprocable within said glass holding cylinder, said control member storing and holding the glass fed out of said feeder both in a region on the upper surface of said control member within said glass holding cylinder and in a region under the lower surface of said control member for a predetermined period of time after cutting of the glass by gradually displacing downwardly from a predetermined upper limit position to a predetermined lower limit position.

* * * * *